United States Patent [19]

Chen et al.

[11] Patent Number: 5,057,133
[45] Date of Patent: Oct. 15, 1991

[54] THERMALLY EFFICIENT MELTING AND FUEL REFORMING FOR GLASS MAKING

[75] Inventors: Michael S. Chen, Zionsville; Corning F. Painter; Steven P. Pastore, both of Allentown; Gary S. Roth, Trexlertown; David C. Winchester, Allentown, all of Pa.

[73] Assignee: Air Products and Chemicals, Inc., Allentown, Pa.

[21] Appl. No.: 547,894

[22] Filed: Jul. 2, 1990

[51] Int. Cl.$^5$ .................................... C03B 5/235
[52] U.S. Cl. ................................ 65/27; 423/437; 431/2
[58] Field of Search ............... 423/437, 652; 65/134, 65/136, 27, 335; 431/4, 2

[56] References Cited

U.S. PATENT DOCUMENTS

| | | | |
|---|---|---|---|
| 3,337,324 | 8/1967 | Cable Jr. et al. | 65/135 |
| 3,528,930 | 9/1970 | Schlinger | 423/437 |
| 3,592,622 | 7/1971 | Shepherd | 65/135 |
| 3,592,623 | 7/1971 | Shepherd | 65/135 |
| 3,627,504 | 12/1971 | Johnson et al. | 65/135 |
| 3,856,496 | 12/1974 | Nesbitt et al. | 65/29 |
| 3,880,639 | 4/1975 | Bodner et al. | 65/134 |
| 4,350,512 | 9/1982 | Krumwiede | 65/27 |
| 4,473,388 | 9/1984 | Lauwers | 65/134 |
| 4,528,012 | 7/1985 | Sturgill | 65/135 |
| 4,531,960 | 7/1985 | Desprez | 65/134 |
| 4,539,035 | 9/1985 | Burckhardt et al. | 65/136 |
| 4,542,114 | 9/1985 | Hegarty | 423/655 |
| 4,553,997 | 11/1985 | Hnat | 65/27 |
| 4,622,007 | 11/1986 | Gitman | 432/13 |
| 4,642,047 | 2/1987 | Gitman | 432/13 |
| 4,696,690 | 9/1987 | Roloff | 65/27 |
| 4,761,132 | 8/1988 | Khinkis | 431/10 |
| 4,882,736 | 11/1989 | Pieper | 373/32 |
| 4,963,339 | 10/1990 | Krishnamurthy et al. | 423/650 |

FOREIGN PATENT DOCUMENTS 840351 7/1960 United Kingdom .................... 431/4

OTHER PUBLICATIONS

*Unit Processes and Principles of Chemical Engineering*, Field, 1932, pp. 1-3, Van Nostrand Company, Inc. In re Edwards, 109USPQ380 (CCPA1956) Jun. 12, 1956.

Miller, H. R. & Royds, K.; "The Use of Oxygen in Glass Making Furnaces"; *Glass Technology*; vol. 14, No. 6, Dec. 83, pp. 171-181.

*The Handbook of Glass Manufacture*; vol. 1; 3rd Edition; Dr. Tooley, Fay V.-Editor; Ashlee Publishing Company; 1984.

Doyle, E7 & Donaldson, LS; "Glass Batch Preheating Utilizing Fluidized Technology"; 1984 Int'l. Gas Res. Conf.

Technology Profile brochure; published by Gas Research Institute; Mar. 1986.

J. Tang; "Application of Pure Oxygen with Batch Pretreating to Glass Melting Furnaces"; 1989.

Fleming, D. K. & Khinkis, M. J. "Thermochemical Recuperpator System Advanced Heat Recovery"; 12th Energy Technology Conf. & Exposition; Wash., D.C.; pp. 25-27, Mar. 1985.

*Primary Examiner*—Richard V. Fisher
*Assistant Examiner*—John Hoffman
*Attorney, Agent, or Firm*—Geoffrey L. Chase; James C. Simmons; William F. Marsh

[57] ABSTRACT

An integrated process for utilizing waste heat from a glass making furnace. The hot off-gas from the furnace is initially partially cooled, then fed to a reformer. In the reformer, the partially cooled off-gas is further cooled against a hydrocarbon which is thus reformed into a synthesis gas, which is then fed into the glass making furnace as a fuel. The further cooled off-gas is then recycled back to absorb the heat from the hot off-gas to perform the initial cooling.

12 Claims, 2 Drawing Sheets

THERMALLY EFFICIENT MELTING AND FUEL REFORMING FOR GLASS MAKING

The Government of the United States of America has rights in this invention pursuant to Contract No. DE-AC02-89CE40917 awarded by the U.S. Department of Energy.

TECHNICAL FIELD

The present invention is directed to improved processing for oxygen enriched glassmaking furnaces with reforming of fuel and integrated processing of heat and process streams. More particularly, the present invention is directed to the use of commercially pure oxygen in a glassmaking furnace with recovery of heat from the offgas by at least partially reforming furnace fuel, which offgas is predominately carbon dioxide due to the oxygen purity and which carbon dioxide can be recovered for recycle and for export as product.

BACKGROUND OF THE PRIOR ART

The glass manufacturing industry has made numerous attempts to enhance the efficiency of glassmaking furnaces which by and large utilize very traditional combustion technology.

For instance, a number of patents have contemplated utilization of oxygen enriched combustion gas in a glassmaking furnace, such as U.S. Pat. No. 3,337,324 which discloses the use of oxygen enriched air to raise combustion temperature and heat transfer rate to melt batch in a glassmaking furnace. U.S. Pat. Nos. 3,592,622 and 3,592,623 suggest the use of oxy-fuel burners to accelerate batch melting in a furnace. U.S. Pat. No. 3,627,504 discloses a submerged burner to promote homogeneous mixing of glass coloring added to batch. U.S. Pat. No. 3,856,496 discloses the use of two pairs of oxygen enriched air burners mounted in the wall of a glassmaking furnace for melting raw batched materials within the furnace. U.S. Pat. No. 4,473,388 suggests low momentum oxy-fuel flames aimed at the batch/glass interface which covers the entire width of the furnace to improve melting and fining. U.S. Pat. No. 4,531,960 teaches heating the batch in a glassmaking furnace by a combination of one air-fuel flame and one oxygen-fuel flame. U.S. Pat. No. 4,539,035 discloses an oxygen burner positioned on the top of a furnace wall for injecting a flame downward, with a shower of cullet surrounding the flame, for heating the cullet and for protecting the furnace wall. U.S. Pat. Nos. 4,622,007 and 4,642,047 disclose liquid cooled oxy-fuel burner designs for two-stage combustion for melting materials, such as glass. U.S. Pat. No. 4,761,132 suggests oxygen-rich gas burners for two-stage combustion for $NO_x$ control for the glass industry. British patent 2,140,910 discloses an oxy-fuel burner design for glass melting tanks which do not decrease the flame length. An article entitled "The Use of Oxygen in Glass Making Furnaces", H. R. Miller and K. Royds appearing in *Glass Technology*, volume 14, no. 6, December 1973, pages 171-181, discusses oxy-fuel trials conducted in a glassmaking furnace.

The co-generation of electricity from the waste heat recovered from a glassmaking furnace has been the subject of various disclosures, including U.S. Pat. No. 4,528,012 which suggests methods of recovery of useful energy by transferring heat from hot waste gas leaving a glassmaking furnace regenerator to a compressed air stream and then expanding the hot air for power generation. The expanded air at reduced pressure is then used for combustion in the glassmaking furnace.

The glass making industry has also sought various ways of heating cullet and batch with the waste heat from glassmaking furnace, exemplified by U.S. Pat. No. 3,880,639 which discloses a method for pollution abatement in a glass melting process by passing hot waste gas countercurrently for direct heat exchange with agglomerated alkaline glass batch. Sulphur compounds in the waste gas are removed by reacting with the alkaline glass batch. U.S. Pat. No. 4,350,512 suggests that cullet may be used to recover heat and particulate from hot waste gas. Electrostatic means may be used to enhance the particulate collection. U.S. Pat. No. 4,441,906 suggests a method for preheating glass batch with heating media which is heated in turn by furnace exhaust gas and using the heated media to preheat the glass batch. A technique to clean media of gas condensate is also included. U.S. Pat. No. 4,696,690 suggests a method using hot waste gas to preheat raw materials, particularly cullet, in a bunker bed up to about 716° F. and the cooled waste gas is then sent to a wet scrubber to remove $SO_x$, $NO_x$ and particulates.

The prior art has also contemplated the recovery of carbon dioxide from the glassmaking process as described in page 394 of the book, the Handbook of Glass Manufacture, Vol. 1, Third Edition, Editor, Dr. Faye V. Tooley, Ashlee Publishing Company, 1984, in which carbon dioxide is recovered from an all-electric glass melter as a component of offgas from the glass melt itself.

U.S. Pat. No. 4,882,736 discloses a technique for recovering heat from the hot offgas from a glassmaking furnace by countercurrently heat exchanging the offgas with glass batch floating on the surface of the molten glass.

The use of a fluidized bed batch preheater was suggested to recover some waste heat from the flue gas in a paper entitled "Glass Batch Preheating Utilizing Fluidized Technology", by E. F. Doyle and L. S. Donaldson, 1984 International Gas Research Conference and in a brochure of *Technology Profile* published by Gas Research Institute in March, 1986.

Use of pure oxygen for combustion in a glassmaking furnace and recovering the waste heat from the flue gas by preheating the glass batch and cullet in multi-stage cyclones was recently suggested by Jiayang Tang in a paper entitled "Application of Pure Oxygen with Batch Preheating to Glass Melting Furnaces", 1989.

Use of a thermochemical recuperator system to recover some waste heat from the air/fuel combustion flue gas from a glassmaking furnace was suggested by Donald K. Fleming and Mark J. Khinkis in their paper entitled "The Thermochemical Recuperator System—Advanced Heat Recovery", 12th Energy Technology Conference and Exposition, Washington, D.C., Mar. 25-27, 1985. In this system the heat absorbed by the chemical reactions through steam/methane reforming at 1300–1500° F. enhances the heating value of the fuel and is re-released at flame temperature.

Although the prior art has suggested various individual techniques for incrementally enhancing efficiency of the glass melting process, the glass melting operation remains a significant energy consuming process with minimal heat recovery and sizable effluent treatment concerns. The present invention offers an integrated and unique process for overcoming these efficiency and pollution problems with the recovery of heat energy with the production of higher heat value fuel by reformation, as will be set forth more particularly below.

BRIEF SUMMARY OF THE INVENTION

The present invention is an integrated process for the production of glass utilizing combustion heat to melt glass making materials in a glassmaking furnace, comprising: heating and melting glass making materials of batch and cullet feedstocks in a glassmaking furnace by the combustion of fuel with an oxygen-enriched oxidant stream; removing a hot offgas from said glassmaking furnace comprising a substantially carbon dioxide-containing combustion product and feedstock volatiles and quenching the offgas using a relatively cooler recycle stream of at least a portion of the offgas from downstream in the process; further cooling at least a portion of the offgas against at least a portion of a hydrocarbon fuel fed to the glassmaking furnace to reform the hydrocarbon fuel into a synthesis gas which is fed to the glassmaking furnace as a fuel; recycling a portion of the cooled offgas to quench the hot offgas from the glassmaking furnace; and recovering a refined glass as a product of the process.

Preferably, the reforming is a steam-hydrocarbon reformation.

Alternatively, the reforming is a hydrocarbon-carbon dioxide reformation. Preferably in this alternative at least a portion of the offgas is used as the source of carbon dioxide in the hydrocarbon-carbon dioxide reformation.

Preferably, the offgas after being further cooled by reformation is separated at least in part into a carbon dioxide product, a vent stream and water. More preferably, the carbon dioxide separation is a cryogenic distillation. Alternatively, the carbon dioxide separation is an adsorptive separation. Further alternatively, the carbon dioxide separation is a membrane separation.

Preferably, a portion of the offgas is heat exchanged with the cullet to cool the offgas and heat the cullet. Alternatively, the offgas is heat exchanged with the batch to cool the offgas and heat the batch.

Preferably, the oxygen-enriched gas is commercially pure oxygen. More preferably, the oxygen-enriched gas is at least 93% oxygen.

Preferably, at least a portion of the quenching is performed in a fluidized bed heat exchange. Preferably, at least a portion of the reforming is performed in a fluidized bed heat exchange. Optimally, the fluidizing gas for the fluidized bed heat exchange is provided by the recycled offgas.

Preferably, the hydrocarbon fuel which is not reformed and the synthesis gas fuel are separately fed to the glassmaking furnace. More preferably, the hydrocarbon fuel is fed to the effluent end of the glassmaking furnace.

Preferably, at least a portion of the synthesis gas is separated into a hydrogen stream and a carbon monoxide stream. More preferably, at least a portion of the hydrogen is fed to the influent end of the glassmaking furnace. Preferably, at least a portion of the hydrogen is used as a fuel for submerged combustion in the glassmaking furnace. Alternatively, at least a portion of the hydrogen is used as an inerting media in the tin bath of float glass manufacturing.

Preferably, the offgas is supplementally quenched with a media such as sand, steam, air, liquid water, nitrogen-enriched gas and mixtures thereof or other appropriate media that would not impair the overall process.

More specifically, the present invention is an integrated process for the production of glass utilizing combustion heat to melt glassmaking materials in a glassmaking furnace, comprising: heating and melting glassmaking materials of batch and cullet feedstocks in a glassmaking furnace by the combustion of fuel with an oxygen-enriched oxidant stream; removing a hot offgas from said glassmaking furnace comprising a substantially carbon dioxide-containing combustion product and cooling the offgas by reforming at least a portion of a hydrocarbon fuel to synthesis gas in a hydrocarbon-carbon dioxide reformation using the heat of the offgas to perform the reformation; introducing the synthesis gas into the glassmaking furnace as at least a portion of the fuel to the glassmaking furnace; and recovering a refined glass as a product of the process.

Preferably, at least a portion of the cooled offgas is recycled to the hydrocarbon-carbon dioxide reformation as a source of carbon dioxide to the reformation.

Preferably, the cooled offgas is separated at least in part into a carbon dioxide product, a vent stream and water.

Preferably, at least a portion of the cooled offgas is recycled to quench the hot offgas from the glassmaking furnace.

Preferably, the hydrocarbon fuel which is not reformed and the synthesis gas fuel are separately fed to the glassmaking furnace. More preferably, the hydrocarbon fuel is fed to the effluent end of the glassmaking furnace.

Preferably, at least a portion of the synthesis gas is separated into a hydrogen stream and a carbon monoxide stream. More preferably, at least a portion of the hydrogen is fed to the influent end of the glassmaking furnace. Preferably, at least a portion of the hydrogen is used as a fuel for submerged combustion in the glassmaking furnace. Alternatively, at least a portion of the hydrogen is used as an inerting media in the tin bath of float glass manufacturing.

Preferably, the offgas is supplementally quenched with a media such as sand, steam, air, liquid water, nitrogen-enriched gas and mixtures thereof or other appropriate media that would not impair the overall process.

DETAILED DESCRIPTION OF THE INVENTION

The present invention is an integrated process for the production of glass, utilizing oxygen enriched combustion heat of the hot off-gas from the glassmaking furnace to preheat and reform at least a portion of the fuel gas to the furnace with the option to preheat glassmaking materials, batch and/or cullet. Carbon dioxide in the off-gas can be optionally separated and recovered as a by-product. Two preferred embodiment process schemes disclosed herein are based on the use of oxygen-enriched oxidant (in general commercially pure oxygen defined as $>30\%$ $O_2$, more preferably a high purity oxygen gas defined as >93% $O_2$) for combustion in the glassmaking furnace. Use of oxygen-enriched oxidant, instead of air, in the combustion not only increases the heat transfer rate for batch melting in the furnace but also significantly reduces the waste gas sensible heat loss to the stack by virtue of flow reduction because nitrogen is eliminated. In addition, use of high purity oxygen in the process makes the recovery of high purity by-product $CO_2$ economically more attractive. Both process schemes are also based on the concept of using the heat from the hot off-gas to preheat and reform at least a portion of the fuel, e.g. hydrocarbons such as natural gas or other methane containing streams. Since reforming reactions, either steam/hydrocarbon(methane) or hydrocarbon(methane)/carbon dioxide, are highly endothermic, the processes of this invention are capable of storing the recovered heat chemically in the reformed gas at reasonable temperatures and re-releasing this chemical energy as heat when it is combusted with O2 in the glassmaking furnace. Any leftover heat from the fuel preheating/re-forming can be used to generate steam or to preheat the batch-/cullet raw materials.

These preferred embodiment processes will now be described in greater detail with respect to accompanying drawings. It is to be understood that variations of these processes are within the scope of this invention and the specific process conditions are for illustration purposes only.

Figure 1:
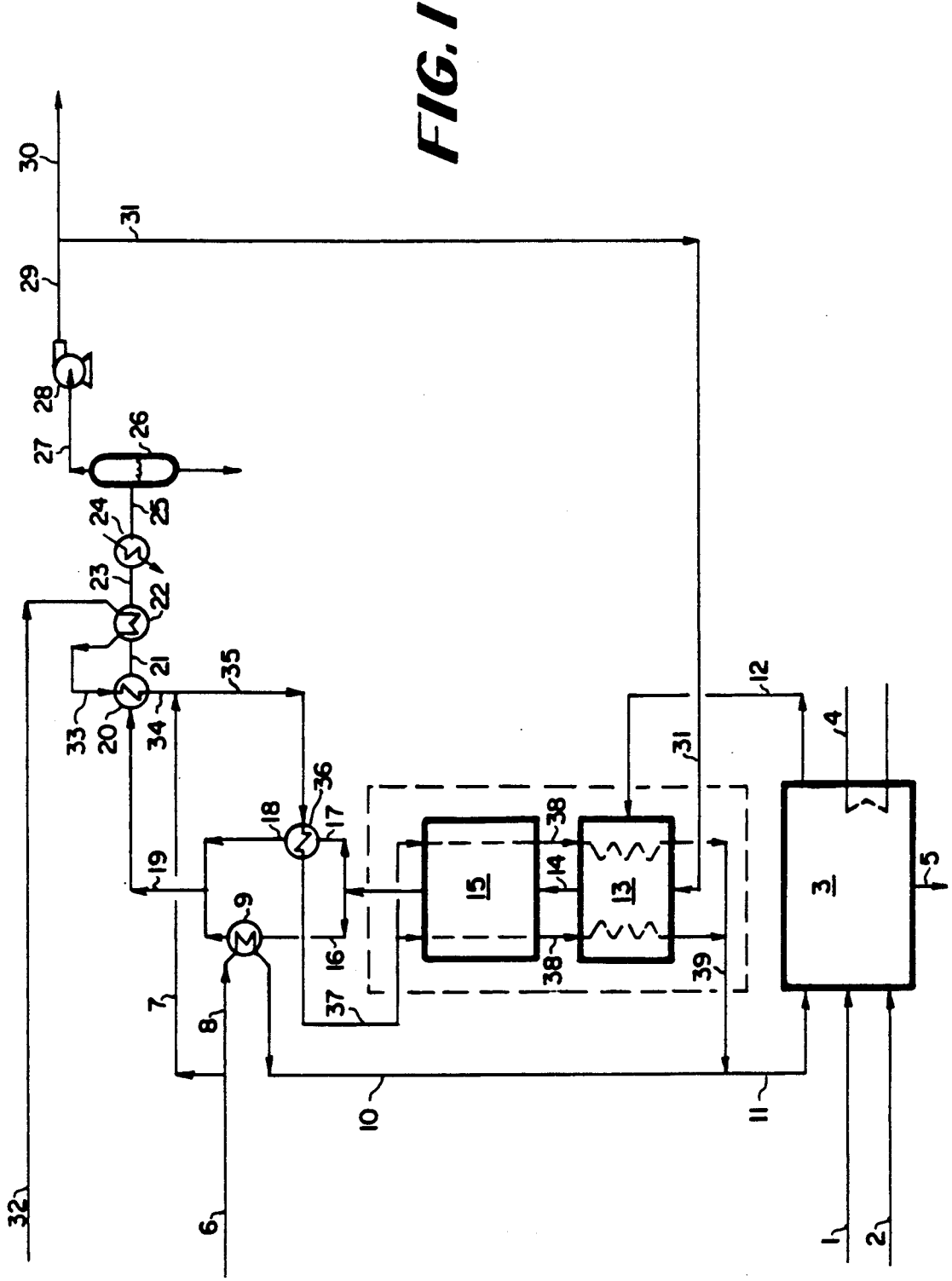
FIG. 1 is a first embodiment of the present invention illustrated in a schematic flow scheme with steam-methane reforming.

With regard to FIG. 1, the first embodiment shows a flow diagram for the first process scheme of this invention for producing 250 TPD (tons per day) of glass. This process is designed on the concept of preheating the natural gas feed and performing the endothermic, catalytic steam/methane reforming to recover the waste heat from the hot exhaust offgas from an oxy-fuel fired glassmaking furnace. In addition, a portion of cooled CO2-rich off-gas is recycled for quenching the hot offgas and for fluidizing the heat exchange-sand bed in the reformer.

As shown, 60,801 SCFH (standard cubic feet per hour) of high purity oxygen stream 1, along with 16,584 lbs/hr of batch materials and 7,108 lbs/hr of cullet stream 2 (collectively glassmaking materials), is fed to the glassmaking furnace 3. The furnace is also electrically boosted with a power input 4 of about 750 KW. The glassmaking materials are melted, and 250 TPD of molten glass is withdrawn through line 5. Fuel, comprising 29,645 SCFH of natural gas, is supplied through feedline 6, which is first split into two streams, 7 (40%) and 8 (60%). Stream 7 is mixed with steam, stream 34 from feed water 32 which is converted to steam by heat exchange 20 against cooling offgas, to form stream 35 as a reformer gas feed. Stream 8 is heated in the feed preheater 9 to 1,000 F against the offgas. The exit gas 10 is mixed with the reformed fuel, stream 39 comprising a synthesis gas at 1,600 F, to be described in more detail later, to yield a mixed fuel gas stream 11 at 1364 F with a flowrate of 73,188 SCFH and a composition of 24% $CH_4$, 10% $H_2O$, 14% CO, 49% $H_2$ and 2% $CO_2$. This stream is fed to the glassmaking furnace 3 as a combustion fuel. Alternatively, stream 10 and stream 39 can be fed to the furnace separately (not shown). The benefit of separately firing the hydrocarbon fuel and the reformed fuel is that the reformed fuel could be better utilized at the feed end of the furnace where the batch is introduced, while the hydrocarbon fuel would be better utilized at the effluent end of the furnace depending on the flame and heat transfer characteristics. Also, a slip stream from stream 39 can be withdrawn as a syngas by-product (not shown). Additionally, the syngas can be separated into hydrogen and carbon monoxide streams, wherein the separated hydrogen can be used for submerged combustion in the furnace or for downstream glass processing, such as inerting of the float glass tin bath. The carbon monoxide could be recombined with the other fuels to be combusted in the glassmaking furnace.

After combustion, the hot off-gas 12 at 150,323 SCFH comprising a substantially carbon dioxide-containing combustion product and feedstock volatiles with a composition of 60% $H_2O$, 36% $CO_2$, 1% $O_2$ and 3% $N_2$ & Ar at about 2,200 F from the furnace is fed to a reformer for indirect heat exchange with the hydrocarbon fuel to be reformed. In a preferred process arrangement, the hot gas is first quenched to 1,700 F in a fluidized sand bed section 13 of the reformer. A fluidized bed (preferably with sand) is used to promote solids capture from the hot offgas, achieve high heat transfer and prevent tube fouling. Soda ash or lime can be added to help capture hot condensates, such as sodium sulfate. A small amount of sand can be purged, cooled off and mixed with the batch materials to prevent the buildup of solids that are carried over in the hot offgas from the combustion and melting in the glassmaking furnace. To control the temperature (hot gas quenching) and to provide a source gas for fluidization, the fluidized bed is also fed with 37,327 SCFH of a relatively cooler recycle stream 31 (12% $H_2O$ and 88% $CO_2$) at about 150 F and 30 psia comprising at least a portion of the offgas from the downstream processing to be described below. It is also contemplated that other media can be used to quench the hot offgas, such as but not limited to sand, steam, air, liquid water, nitrogen-enriched gas and mixtures thereof, etc. In the fluidized bed, the sensible heat recovered from the hot offgas is used to reform the steam/methane gas mixture 38 inside the submerged reformer tubes which are packed with reforming Ni catalyst. Offgas 14 at 1,700 F is further cooled to 1,075 F in the countercurrent section 15 of the reformer. In this section, the preheated steam/methane feed 37 is heated countercurrently by absorbing the heat from the stream 14, and the mixture is reformed to $H_2$/CO-rich synthesis gas mixture in the tubes packed with reforming catalyst. In another arrangement for the reformer, the countercurrent section of cage-recuperator type heat exchanger designs and the fluidization section could be reversed. The advantage of this arrangement is that the fluidized bed is operated at lower temperatures and is better able to capture more hot condensates such as sodium sulfate and keep the heat exchange tubes of the reformer clean.

The offgas from the reformer is split into two streams, 16 and 17. Stream 16 is used to preheat in heat exchanger 9 a portion of the natural gas feed 8 as described above and stream 17 is used to preheat in heat exchanger 36 stream 35, which is a mixture of steam 34 and natural gas feed 7. Stream 16 and resulting stream 18 form the combined cooled offgas 19 at 844 F is cooled in a steam boiler 20 to 662 F while heating hot feed water 33 to high temperature steam 34, and the exit offgas 21 is further cooled in the boiler feed water preheater 22 to 486 F, in which 964 lbs/hr of the boiler feed water 32 at 75 psia is heated to about 300 F. The hot feed water 33 is passed to the steam boiler 20 to generate steam 34 at about 312 F which is then mixed with the natural gas stream 7 to form a mixed gas 35 at 224 F. Stream 35 is heated further in the mixed feed preheater 36 to 1,000 F. This stream 35 at 31,979 SCFH with a composition of about 37% $CH_4$ and 63% $H_2O$ (steam/carbon ratio of 1.7) is then fed to the tube side of the countercurrent section of the shell and tube reformer 15 in which catalytic reforming reactions take place. The partially reformed gas mixture 38 (designating a plurality of tubes and reformate streams) at 1,450 F is further heated and reformed on the tube side of the fluidized bed section 13 of the reformer. 33,934 SCFH of the reformed gas 39 exiting the reformer at 1600 F with a composition of 0.48% $CH_4$, 21% $H_2O$, 30% CO, 44% $H_2$ and 4% $CO_2$ is then mixed with another portion of heated natural gas feed, stream 10, to form a mixed reformed fuel 11 and the mixture is fed to the glassmaking furnace 3. A slip stream from stream 39 may also be used as a by-product synthesis gas as described above.

Now returning to the cooled offgas stream 23, this gas exiting the BFW preheater 22 has a flowrate of 187,647 SCFH at 487 F and 15 psia, with a composition of 50% $H_2O$, 46% $CO_2$, 1% $O_2$ and 2% $N_2$ and Ar, is further cooled in the condenser 24 to condense out some water vapor from the offgas 25. The condensed water is separated in the separator 26 and recycled to the batch for dust control or simply treated and discharged. The relatively dry overhead cooled offgas 27 is then pressure boosted by an induced draft fan 28. Exit offgas 29 is split into two streams, 30 and 31. Stream 30 is sent to a $CO_2$ recovery section or to a stack (not shown). Stream 31 is recycled to the reformer 13 as described above as a quenching gas and as a fluidizing gas as described before.

This process has a specific thermal energy of 3.11 MMBTU per ton of glass and a thermal efficiency of about 64%. If the power generation efficiency of 33% is considered, then the overall thermal energy efficiency of this process is about 47% with a specific energy input of 4.3 MMBTU/ton of glass. Compared to an air-based process, this process uses half the electric energy and reduces the fuel energy consumption by 22%.

Figure 2:
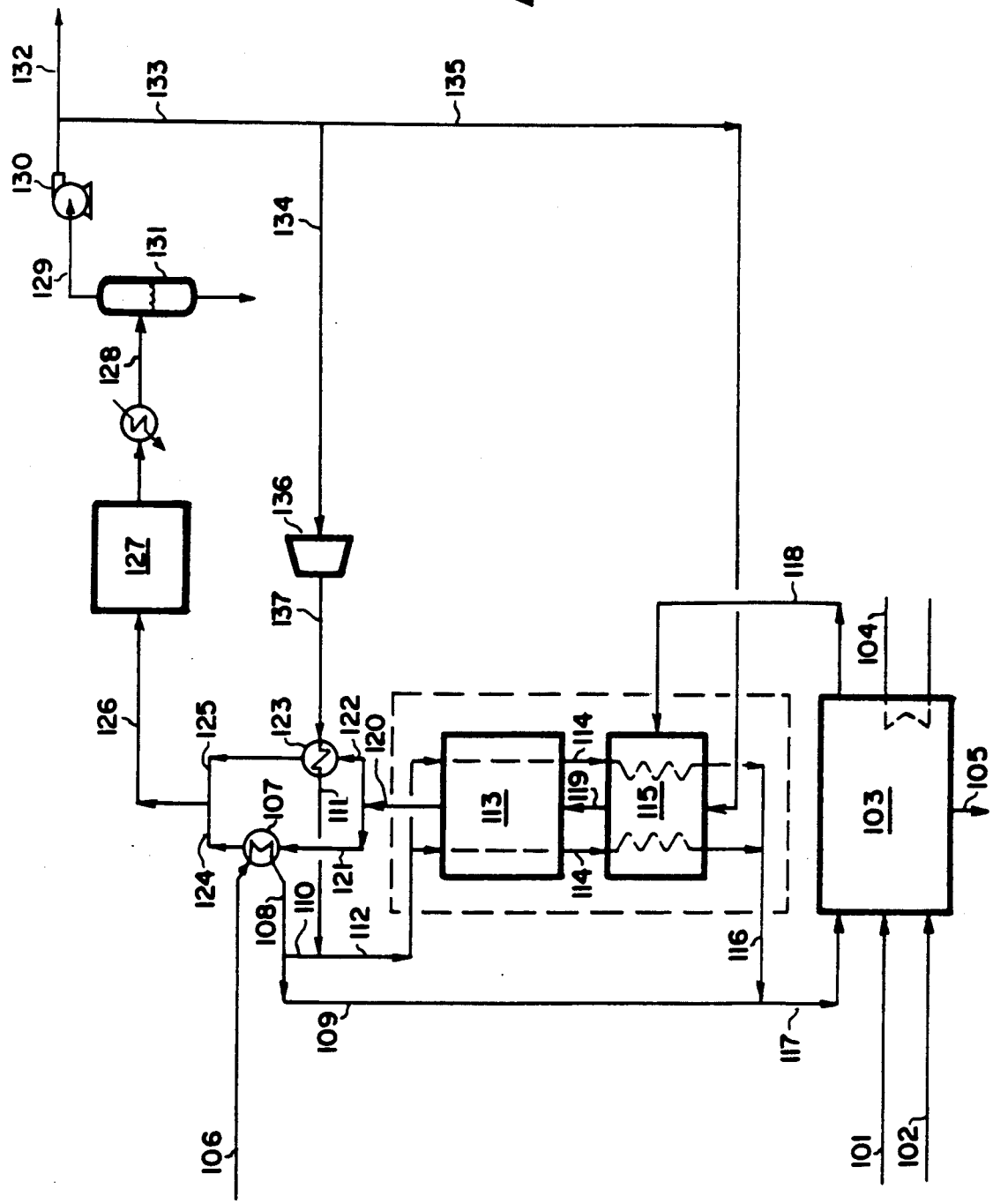
FIG. 2 is a second embodiment of the present invention illustrated in a schematic flow scheme with hydrocarbon-carbon dioxide reforming.

FIG. 2 shows a flow diagram of the second preferred embodiment process scheme of this invention for producing 250 TPD of glass. This process utilizes the concept of recovering the waste heat of the combustion of the glassmaking furnace for preheating the hydrocarbon or natural gas feed and effecting the endothermic, catalytic hydrocarbon(methane)/carbon dioxide (dry) reforming reactions by using a portion of the recycled cool $CO_2$-rich offgas for reforming at least a portion of the fuel (without the need of generating steam for reforming the fuel as in the preceding process embodiment). Residual heat in the offgas is used to preheat the cullet. Some recycled cool $CO_2$-rich offgas is also used as a quenching gas and as a fluidizing gas for the fluid bed portion of the reformer.

As shown, 57,298 SCFH of an oxygen-rich oxidant stream 101, is fed along with 16,584 lbs/hr of cold batch materials and 7,108 lbs/hr of cullet (750° F.), stream 102, to the glassmaking furnace 103. The furnace is also electrically boosted 104 with a power input of 750 KW. The molten glass at 250 TPD is withdrawn through line 105. In one process arrangement, 29,890 SCFH of the hydrocarbon or natural gas feed 106 is first preheated in a preheater 107 to 1,000 F. The exit fuel gas 108 is split into two streams, 109 (65%) and 110 (35%). Stream 110 is mixed with the preheated recycled $CO_2$-rich offgas stream 111 at 1,000 F such that a $CO_2$/carbon ratio of about 2.0 and a steam/carbon ratio of about 0.3 (higher ratios can be adjusted by feeding additional steam) are maintained. In another process arrangement, a portion of the hydrocarbon or natural gas 106 may be mixed with the recycled $CO_2$-rich offgas 137 and the mixture is preheated for the reformer and the other portion of the gas is preheated separately. The fuel mixture 112 at 32,027 SCFH and a composition of 30% $CH_4$, 9% $H_2O$, and 61% $CO_2$ is fed to the tube side of the countercurrent section 113 of the reformer. The exit partially reformed fuel gas 114 at 1,410 F is further heated and reformed in the tube side of the fluidized-bed section 115 of the reformer. The exit fuel gas or synthesis gas 116 with a flow of 51,467 SCFH and a composition of 0.08% $CH_4$, 12% $H_2O$, 44% CO, 31% $H_2$ and 12% $CO_2$ at 1600 F and 30 psia is mixed with the preheated hydrocarbon or natural gas stream 109. Alternatively, streams 109 and 116 can be fed to the furnace separately. The use and treatment of the hydrocarbon fuel and the reformed fuel can be in accordance with the alternatives recited in the first embodiment discussed above with regard to FIG. 1. The mixture 117 of unconverted fuel and reformed fuel, with a flow of 69,596 SCFH and a composition of 26% $CH_4$, 9% $H_2O$, 33% CO, 23% $H_2$ and 9% $CO_2$ at 1,361°F and 30 psia, is fed to the glassmaking furnace 103 for combustion with $O_2$. The hot offgas 118 comprising a substantially carbon dioxide-containing combustion product, with a flowrate of 146,904 SCFH at 2,200 F and 15 psia, is passed on to the fluidized-bed section 115 of the reformer for heat recovery. A stream of cooled recycled $CO_2$-rich offgas 135, with a flow of 36,990 SCFH with a composition of 12% $H_2O$ and 88% $CO_2$ at 150 F and 30 psia, is injected into the shell side of the fluidized bed reformer 115 for quenching the hot offgas and fluidizing the sand to enhance the heat exchange. The combined quenched offgas coming directly from the furnace with the recycled cool offgas 119 exits the fluidized bed 115 of the reformer at 1,700 F and is passed to the countercurrent section 113 of the reformer and is cooled to 1,100 F. The cooled offgas exit stream 120 is split into two streams, 121 and 122. Stream 121 is used to reheat the hydrocarbon or natural gas feed 106 in the preheater 107, and stream 122 is used to preheat the recycled $CO_2$-rich offgas stream 137 in the $CO_2$ preheater 123. Two exit streams, 124 and 125, are combined to a mixed offgas stream 126 with a flow of 183,898 SCFH at 850° F., which is then cooled in the heat exchanger 127 to recover some useful heat and to preheat the cullet to 750° F., and the mixed stream is further cooled in heat exchanger 128 to condense water vapor. The water is separated in the separator 131, and the water can be recycled to the batch for dust control or simply treated and discharged. The overhead offgas stream 129, relatively dry and rich in $CO_2$, is pressure-boosted by an I.D. fan 130. The exit offgas stream 131 is split into two streams, 132 and 133. Stream 132 is sent to a $CO_2$ recovery section or to a stack (not shown). Offgas stream 133 is further split into two streams, 134 and 135. Stream 134 is compressed to about 30 psia by a recycle compressor 136. The exit offgas 137 is preheated in the $CO_2$ preheater 123 to 1,000 F and mixed with the preheated hydrocarbon or natural gas 110 as described before. The other recycled $CO_2$-rich offgas stream 135 with a composition of 12% $H_2O$ and 88% $CO_2$ and a flow of 36,990 SCFH is used to quench the hot offgas from the furnace and to fluidize the sand-bed in the reformer fluidization section 115 as described above.

CO$_2$ needed for reforming may also come from the backend CO$_2$ recovery area. The order of the fluidization section and the countercurrent section of the reformer may also be reversed as explained in the process description of the first process on this invention previously.

This second process of the invention has a specific energy input of 2.94 MMBTU per ton of glass and a thermal efficiency of 67.9%. If the power generation efficiency of 33% is considered, the overall energy efficiency is about 48.8% with a specific energy of 4.1 MMBTU/ton of glass and a required energy of melting of 2 MMBTU/ton glass. Compared to the air-based process, this second process reduces electric boosting energy by half and fuel consumption by 27%.

The processes of this invention solve the problem of efficient glassmaking and pollution abatement by using oxygen-enriched oxidant gas (commercially pure which is deemed to be above 30% O$_2$ in general, and high purity which is deemed to be above 93% preferably) for combustion with fuel in the glassmaking furnace to achieve high heat fluxes to melt the glassmaking materials and to reduce the waste gas flow rate substantially. Thus, sensible heat loss in the offgas and heat losses through furnace walls and ducts etc. are reduced substantially. A smaller offgas stream also makes waste heat recovery easier and more economical. Traditional regenerators for air preheating are eliminated. Instead, the heat is used to preheat and reform the fuel gas and bring the heat energy back to the furnace. Therefore, overall energy efficiency is improved significantly. Furthermore, high-purity CO$_2$ can be recovered as a valuable by product from the offgas. Because N$_2$ is substantially reduced or eliminated, NOx production is minimized which makes the use of expensive de-NOx devices unnecessary. Reduced hot gas flow through the system also results in reduced particulate carryover; expensive solids removal systems such as electrostatic precipitators or baghouses are also eliminated. Fluidized (sand is preferred) bed used for heat transfer to preheat and reform the fuel gas also serves as a hot gas quencher to avoid the use of high temperature materials. In addition, fluidized sands also help capture particulates and the condensables such as sodium sulfate. Sands with captured condensates and the like can be purged, mixed with the batch materials and recycled back to the furnace. Both processes of this invention have been shown to save thermal energy over 20% as compared to the conventional air-based process. This is possible only by a proper integration of the heat recovery schemes of this invention which consists of natural gas preheating, steam/methane or CO2/methane reforming, cullet and/or batch preheating from an oxyfuel fired glassmaking furnace. Recycling cooled CO$_2$ stream for quenching/fluidizing solve the corrosive problems encountered in recovering heat from hot, corrosive gas.

The use of a fluidized-bed for simultaneous hot gas quenching, condensate capture and enhanced heat transfer and fuel gas reforming has not been suggested previously and distinguishes the present invention from the prior art.

The use of recycled cool CO$_2$-rich offgas as a quenching gas as well as a fluidizing agent in the fluidized section of a reformer has not been suggested by the prior art in this context. The cool offgas under pressure as a fluidizing gas overcomes the inherent difficulty of using low pressure (a few inches of water) hot offgas to support the fluidization of the bed. Cool offgas also helps to protect the inlet distributor or grid from exposure to excessive high temperatures. Offgas under pressure helps create intimate mixing of sands and the hot offgas. The resulting good mixing promotes temperature uniformity throughout the bed and provides high heat transfer rates between the gas and the solids, and between the solids and the submerged reforming tubes. Again, these advantages distinguish the present invention from the prior art.

Sand is the preferred material for use in the fluidized bed because of its low cost and its availability (indigenous to the process). Small amounts of hot sand with captured dust, sodium sulfate and other condensables can be purged from the bed, mixed with glass batch raw materials and recycled back to the glassmaking furnace without creating hazardous solid waste. Additionally, soda ash or lime, are both indigenous to the glassmaking process, and can be conveniently added to the sand bed to enhance SOx capture. The resulting mass can be recycled back to the batch without creating hazardous solids waste either. This provides an unexpected improvement in pollution abatement over the prior art and particularly the art which discloses thermo-chemical heat utilization.

The use of the countercurrent section on top of the fluidized section of the reformer (steam or CO2) maximizes the heat recovery from the hot gas. The countercurrent arrangement of indirect heat exchanging permits heat recovery from the hot gas to a greater degree than the fluid-bed section with a single uniform temperature. The countercurrent section is preferably mounted on top of the fluid section and serves as a freeboard area for gas/solid separation.

The use of CO$_2$ for hydrocarbon or methane reforming is preferred because the on-purpose steam needed for steam/methane reforming and an associated steam boiler are avoided. Also in the absence of added steam, the tail gas flow is reduced. The preferred catalysts used for CO$_2$/hydrocarbon(methane) reforming are commercially available from Sud-Chemie.

CO$_2$ can be economically recovered from the cooled offgas stream as a byproduct to stack gas venting and to help reduce the operating costs. The previously known suggestion was from an all electric melting process where CO$_2$ is solely generated from decomposition of the carbonates from the batch materials. CO$_2$ recovery would not be attractive from air-based, fuel-fired furnace processes because of N$_2$ diluent and the relatively small amount of CO$_2$.

The processes of the present invention use oxygen-enriched oxidant (commercially pure defined as above 30% oxygen, and preferably high purity defined as above 93% oxygen) for combustion with fuel in a glassmaking furnace to achieve high heat fluxes to the glass and to reduce the waste gas flow rate substantially. Thus reducing the heat losses and reducing equipment sizes and thus making waste heat recovery easier and more economical. Furthermore, high purity carbon dioxide can be recovered as a valuable by-product. Because nitrogen is substantially reduced, NO$_x$ production is minimal and expensive de-NO$_x$ devices are not required. Reduced hot gas flow through the system results in reduced particulate carryover. Expensive solids remover system such as electrostatic precipitators or baghouses are thus eliminated. Overall thermal energy reduction of over 20% compared to air based operations are achieved through the highly integrated heat recovery scheme and power recovery schemes.

The present invention has been set forth with reference to several preferred embodiments, however the full scope of the invention should be ascertained from the claims which follow.

We claim:

1. An integrated process for the production of glass utilizing combustion heat to melt glass making materials in a glassmaking furnace, comprising:
   (a) heating and melting glass making materials of batch and cullet feedstocks in a glassmaking furnace by the combustion of fuel with an oxygen-enriched oxidant stream;
   (b) removing a hot offgas from said glassmaking furnace comprising a substantially carbon dioxide-containing combustion product and feedstock volatiles and quenching the offgas using a relatively cooler recycle stream of at least a portion of the offgas from downstream in the process;
   (c) further cooling at least a portion of the offgas against at least a portion of a hydrocarbon fuel fed to the glassmaking furnace to reform the hydrocarbon fuel into a synthesis gas which is fed to the glassmaking furnace as a fuel; and
   (d) recycling a portion of the resulting cooled offgas of step (c) to quench the hot offgas of step (b) from the glassmaking furnace.

2. The process of claim 1 wherein the reforming is a steamhydrocarbon reformation.

3. The process of claim 1 wherein a portion of the offgas is heat exchanged with the cullet to cool the offgas and heat the cullet.

4. The process of claim 1 wherein the offgas is heat exchanged with the batch to cool the offgas and heat the batch.

5. The process of claim 1 wherein the oxygen-enriched gas is commercially pure oxygen.

6. The process of claim 1 wherein the oxygen-enriched gas is at least 93% oxygen.

7. The process of claim 1 wherein at least a portion of the quenching of step (b) is performed in a fluidized bed heat exchange.

8. The process of claim 7 wherein the fluidizing gas for the fluidized bed heat exchange is provided by the offgas recycled in step (d).

9. The process of claim 1 wherein at least a portion of the reforming is performed in a fluidized bed heat exchange.

10. The process of claim 9 wherein the fluidizing gas for the fluidized bed heat exchange is provided by the offgas recycled in step (d).

11. The process of claim 1 wherein the reforming is a hydrocarbon-carbon dioxide reformation.

12. An integrated process for the production of glass utilizing combustion heat to melt glass making materials in a glassmaking furnace, comprising:
   (a) heating and melting glassmaking materials of batch and cullet feedstocks in a glassmaking furnace by the combustion of a hydrocarbon fuel with an oxygen-enriched oxidant stream;
   (b) removing a hot offgas from said glassmaking furnace comprising a substantially carbon dioxide-containing combustion product and feedstock volatiles and quenching said offgas, using a relatively cooler recycle stream of at least a portion of said offgas from downstream in the process, in a fluidized sand bed of a reformer which is fluidized by said relatively cooler recycle stream;
   (c) further cooling at least a portion of said offgas against at least a portion of a hydrocarbon fuel fed to the glassmaking furnace to reform the hydrocarbon fuel into a synthesis gas in said fluidized bed and a countercurrent section of said reformer in which said synthesis gas is fed to said glassmaking furnace as at least a portion of said fuel;
   (d) capturing condensibles from the hot offgas in said sand of the fluidized bed and recycling at least a portion of said condensibles and said sand to said glassmaking furnace; and
   (e) recycling a portion of the resulting cooled offgas of step (c) to quench said hot offgas of step (b) from said glassmaking furnace.

* * * * *